(12) United States Patent
Hosokawa

(10) Patent No.: US 8,085,842 B2
(45) Date of Patent: Dec. 27, 2011

(54) RECORDING APPARATUS

(75) Inventor: Shuichi Hosokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1490 days.

(21) Appl. No.: 11/470,332

(22) Filed: Sep. 6, 2006

(65) Prior Publication Data
US 2007/0058954 A1     Mar. 15, 2007

(30) Foreign Application Priority Data

Sep. 14, 2005   (JP) .................................. 2005-266795

(51) Int. Cl.
*H04N 7/12*     (2006.01)
*H04N 11/02*    (2006.01)
*H04N 11/04*    (2006.01)

(52) U.S. Cl. ......... 375/240.01; 375/240.26; 375/240.27; 375/240.28

(58) Field of Classification Search ............. 375/240.01, 375/240.26–28
See application file for complete search history.

(56) References Cited

U.S. PATENT DOCUMENTS

| | | | | |
|---|---|---|---|---|
| 5,745,645 A | * | 4/1998 | Nakamura et al. ............ | 386/233 |
| 5,771,357 A | * | 6/1998 | Kato et al. .................... | 709/247 |
| 6,236,806 B1 | * | 5/2001 | Kojima et al. ................ | 386/233 |
| 6,512,881 B1 | * | 1/2003 | Kinebuchi et al. ............ | 386/343 |
| 6,671,323 B1 | * | 12/2003 | Tahara et al. ............ | 375/240.26 |
| 7,420,616 B2 | * | 9/2008 | Linzer et al. .................. | 348/441 |
| 2006/0127056 A1 | * | 6/2006 | Yahata et al. ................. | 386/112 |

FOREIGN PATENT DOCUMENTS

JP      9-121360 A     5/1997

* cited by examiner

*Primary Examiner* — Christopher S Kelley
*Assistant Examiner* — Chikaodili E Anyikire
(74) *Attorney, Agent, or Firm* — Canon USA Inc IP Division

(57) ABSTRACT

A recording apparatus includes: an input unit for inputting moving image data; a generating unit for encoding moving image data of 24 fps by selectively using intra-frame coding, forward predictive coding, and bidirectional predictive coding to generate a moving image stream which can be displayed as 2-3 pulldown processed moving image data of 30 fps; a detecting unit for detecting a frame where a redundant field provided in the 2-3 pulldown processing is included and a bottom field is displayed first, from intra-frame coded frames and forward predictive coded frames in the moving image stream, and setting the detected frame as an edit starting point; and a recording unit for forming a plurality of tracks on a recording medium and adding system data indicating whether the edit starting point is included to the moving image stream every n tracks, and recording the moving image stream and the system data.

10 Claims, 12 Drawing Sheets

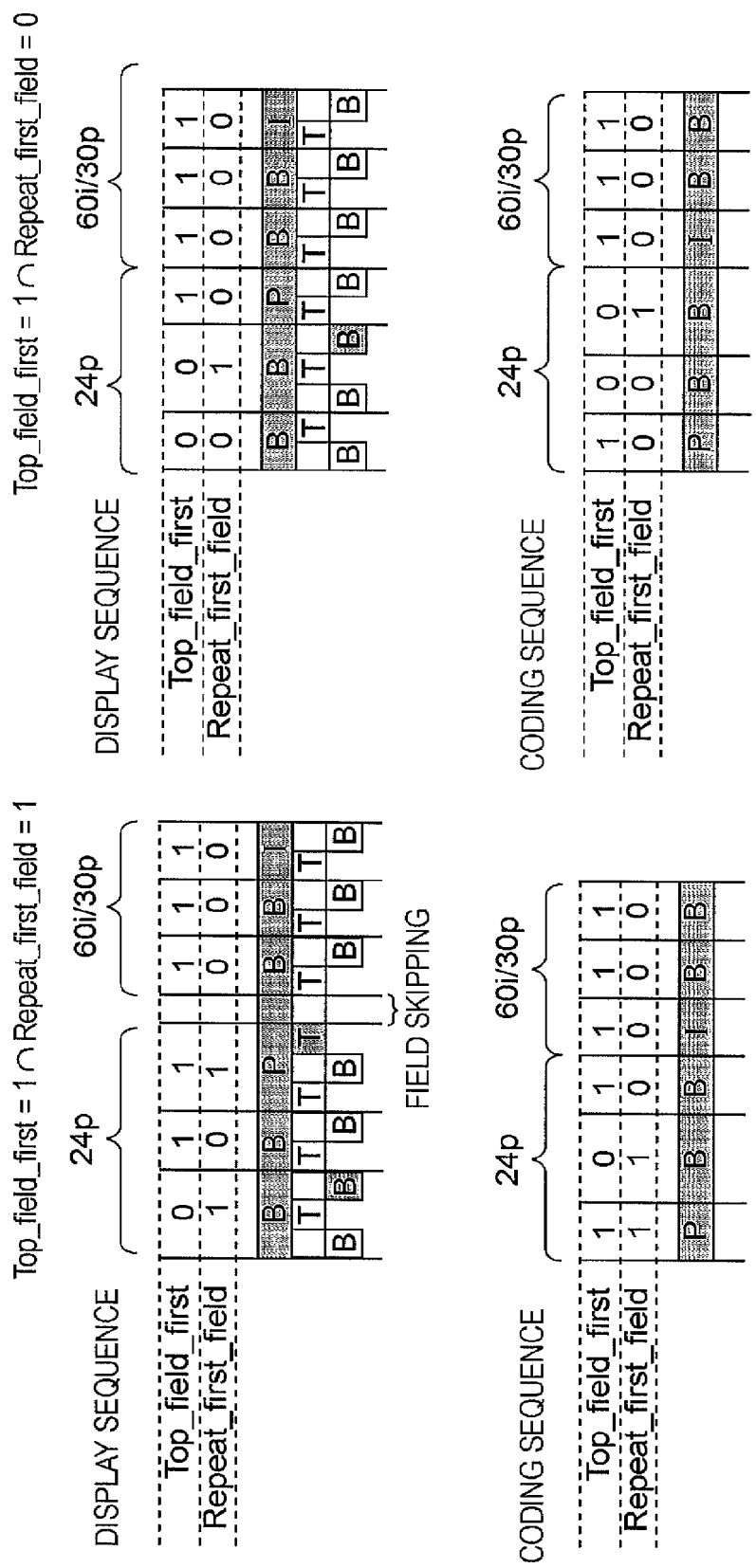

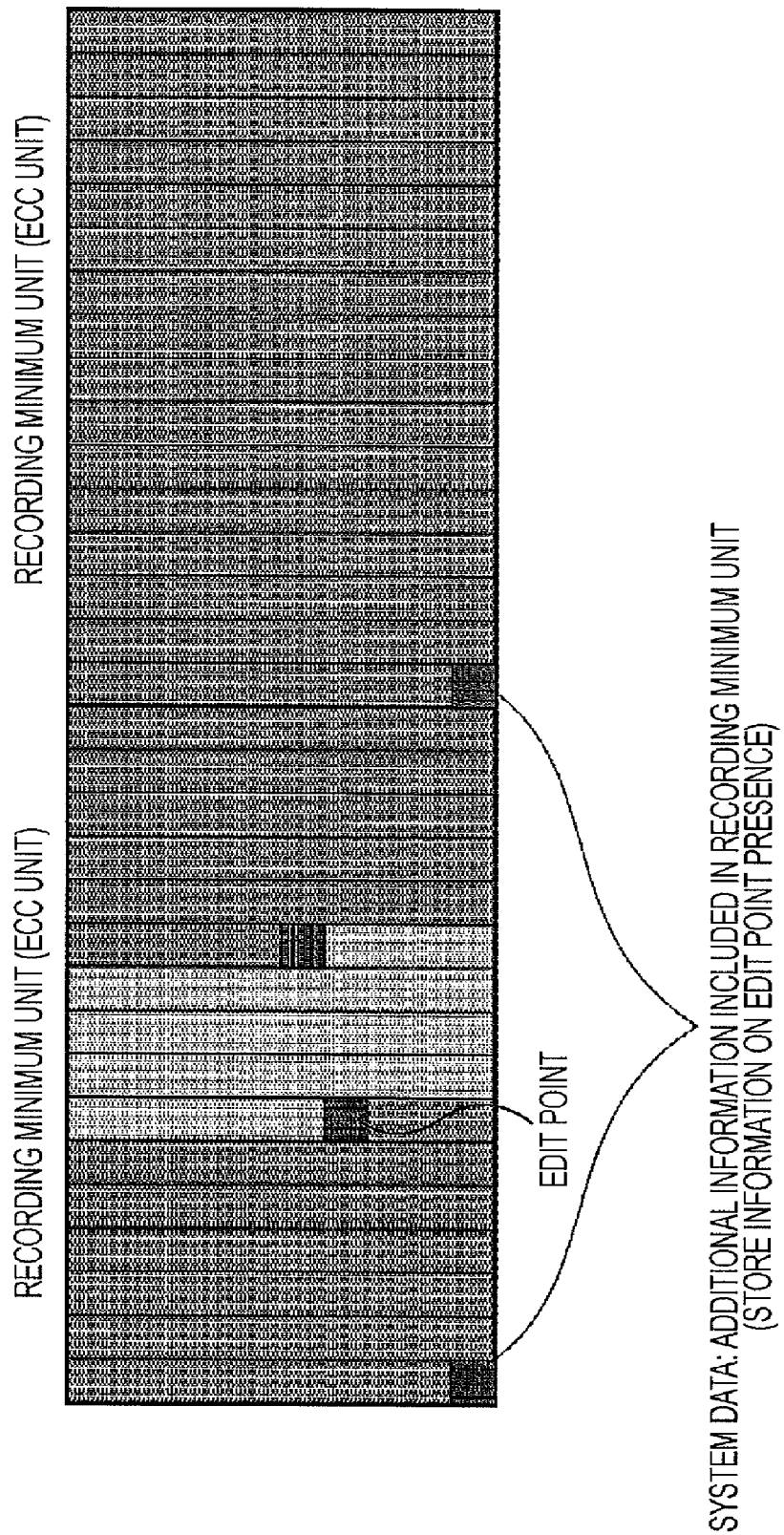

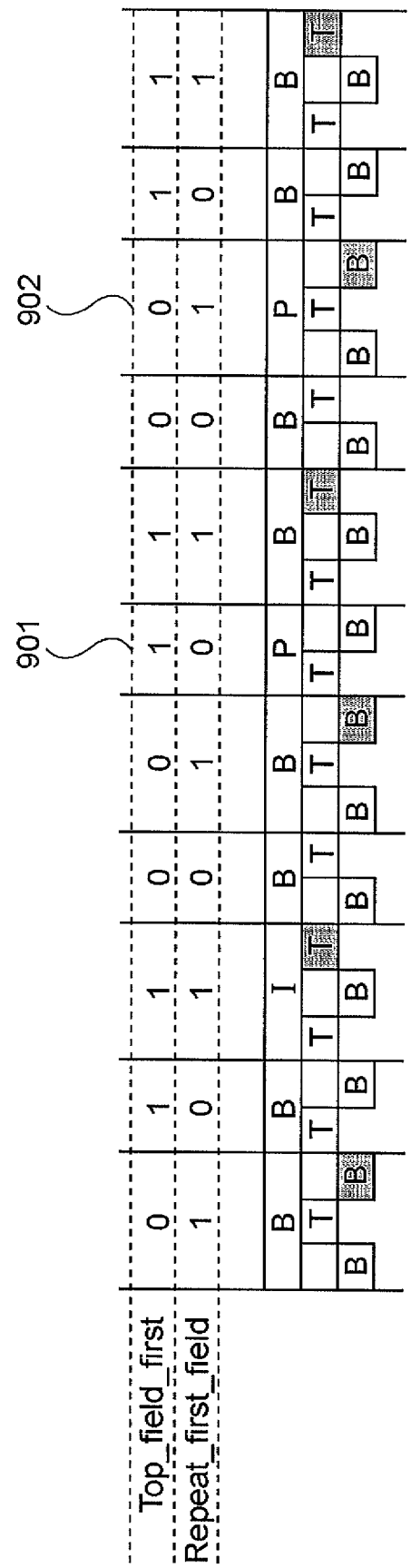

RECORDING APPARATUS

BACKGROUND OF THE INVENTION

1. Field of the Invention

The present invention relates to a recording apparatus.

2. Description of the Related Art

In addition to previously known video cameras for recording obtained image signals on magnetic tapes, video cameras for encoding obtained image signals and recording the encoded image signals in accordance with the MPEG (Moving Picture Experts Group) system have recently appeared on the market.

Typically, this type of video camera obtains and records an NTSC image signal of 60 fields per second. Another type of video camera has also appeared on the market. This type of video camera has the ability to convert an obtained image signal of 24 frames per second such as an image signal used for a movie into an image signal of 60 fields per second and record the converted image signal.

Thus, as a method of converting a film source such as a movie into an interlaced video signal, the 2-3 pulldown technique is widely used. That is, since film employs recording at 24 frames per second whereas videotape employs recording at 30 frames (60 fields) per second, number of fields conversion is performed using the 2-3 pulldown technique. More specifically, as shown in FIG. 1, number of fields conversion is performed by providing a redundant field (hereinafter referred to as a repeat field) every other frame.

A 2-3 pulled-down video signal has a repeat field every other frame, and therefore, a frame in which a top field is displayed first and a frame in which a bottom field is displayed first are interchanged every three frames.

On the other hand, if a typical interlaced video signal of 60 fields per second is recorded in accordance with the MPEG system, a top field (first field) and a second field are typically encoded as a single frame. Therefore, a top field is displayed first in all frames.

As shown in FIG. 2, the case in which MPEG data encoded using the 2-3 pulldown technique and MPEG data acquired by encoding a typical image signal of 60 fields per second are spliced and recorded on tape using a video camera will be considered. In this case, a field alternation error, where a top field is followed by a top field, can occur depending on the frames to be connected. Consequently, an image is sometimes distorted during playback thereof.

As a solution for the above-described case, a technique described in Japanese Patent Laid-Open No. 9-121360 (U.S. Pat. No. 5,771,357 that is a counterpart thereto) has been proposed. In Japanese Patent Laid-Open No. 9-121360, compression coding is performed on the basis of fields, and an encoding start field and an encoding end field are specified, whereby the splice recording of streams can be achieved.

In reality, however, as shown in FIG. 3, an apparatus described in Japanese Patent Laid-Open No. 9-121360 cannot splice MPEG data encoded using the 2-3 pulldown technique and MPEG data acquired by encoding a typical image signal of 60 fields per second and record the spliced MPEG data, because the sequence of top and bottom fields are specified on the basis of a coding sequence. Field skipping can occur at the point where the splice recording is performed.

Referring to FIG. 3, Top_field_first and Repeat_first_field are information added to the top of each frame included in an MPEG stream. Top_field_first is a flag indicating which of top and bottom fields is output first when a corresponding frame is displayed. When Top_field_first indicates one, the top field is displayed first. When Top_field_first indicates zero, the bottom field is displayed first.

When Repeat_first_field indicates one, a field displayed first in a frame is displayed again in the same frame. When Repeat_first_field indicates zero, the top field and the bottom field are individually displayed in a frame.

As shown in FIG. 4, since there are no rules about a repeat field, a decoding time that does not normally occur, occurs at a splice point. In an area 401, even if the area is a typical 60-field interlaced part, a decoding time corresponding to a three-field period is required. As a result, such a stream format tends to cause various problems when it is encoded and decoded.

Accordingly, it would be desirable to provide a format that does not allow the aforementioned splicing anomaly to occur.

SUMMARY OF THE INVENTION

The present invention provides a recording apparatus capable of generating a continuous compressed and encoded stream without occurring a field alternation error and field skipping at the time of splice recording.

According to an aspect of the present invention, a recording apparatus is provided which includes: an input unit configured to input moving image data; a generating unit configured to encode moving image data of 24 frames per second which has been input from the input unit by selectively using intra-frame coding, forward predictive coding, and bidirectional predictive coding to generate a first moving image stream which can be displayed as 2-3 pulldown processed moving image data of 30 frames per second; a detecting unit configured to detect a frame where a redundant field provided in the 2-3 pulldown processing is included and a bottom field is displayed first, from among intra-frame coded frames and forward predictive coded frames which are included in the first moving image stream, and set the detected frame as an edit starting point; and a recording unit configured to form a plurality of tracks on a recording medium and add system data indicating whether the edit starting point of the first moving image stream is included to the first moving image stream every n tracks, wherein n is an integer of one or more, and record the first moving image stream and the system data onto the plurality of tracks.

And according to another aspect of the present invention, the generating unit encodes moving image data of 30 frames per second input from the input unit by selectively using the intra-frame coding, the forward predictive coding, and the bidirectional predictive coding to generate a second moving image stream including frames where a top field is displayed first, and the detecting unit sets all intra-frame coded frames and all forward predictive coded frames which are included in the second moving image stream as the edit starting points, and the recording unit adds the system data to the second moving image stream and records the second moving image stream and the system data onto the plurality of tracks.

According to yet another aspect of the present invention, the recording apparatus may further include a control unit configured to detect the edit starting point of a moving image stream which has been recorded on the recording medium, and cause the recording unit to start splice recording of the first or second moving image stream at the detected edit starting point.

Moreover, according to yet another aspect of the present invention, the recording unit performs error correction coding processing upon data of the first moving image stream, the amount of data corresponding to the n tracks, and records the processed data.

Furthermore, according to another aspect of the present invention, the recording unit starts recording at a frame of the first moving image stream in which a redundant frame provided in the 2-3 pulldown processing is included and a bottom field is displayed first.

In another aspect of the present invention, a recording apparatus is provided which includes: an input unit configured to input moving image data; a generating unit configured to encode moving image data of 24 frames per second which has been input from the input unit by selectively using intra-frame coding, forward predictive coding, and bidirectional predictive coding to generate a moving image stream which can be displayed as 2-3 pulldown processed moving image data of 30 frames per second; a detecting unit configured to detect a predetermined frame from among intra-frame coded frames and forward predictive coded frames which are included in the moving image stream, on the basis of first information indicating whether a redundant field is displayed and second information indicating whether a top field is displayed first, and set the detected frame as an edit starting point; and a recording unit configured to form a plurality of tracks on a recording medium and add system data indicating whether the edit starting point of the moving image stream is included to the moving image stream every n tracks, wherein n is an integer of one or more, and record the moving image stream and the system data onto the plurality of tracks.

According to yet another aspect of the present invention, a method is provided which may be performed in a recording apparatus for generating a continuous compressed and encoded stream without occurring a field alternation error and field skipping at the time of splice recording. Here, the method includes: inputting moving image data; encoding moving image data of 24 frames per second which has been input from the input unit by selectively using intra-frame coding, forward predictive coding, and bidirectional predictive coding to generate a first moving image stream which can be displayed as 2-3 pulldown processed moving image data of 30 frames per second; detecting a frame where a redundant field provided in the 2-3 pulldown processing is included and a bottom field is displayed first, from among intra-frame coded frames and forward predictive coded frames which are included in the first moving image stream, and setting the detected frame as an edit starting point; and forming a plurality of tracks on a recording medium and adding system data indicating whether the edit starting point of the first moving image stream is included to the first moving image stream every n tracks, wherein n is an integer of one or more, and recording the first moving image stream and the system data onto the plurality of tracks.

Additionally, according to yet another aspect of the present invention, a computer readable medium is provided which contains computer-executable instructions capable of being executed in a recording apparatus for generating a continuous compressed and encoded stream without occurring a field alternation error and field skipping at the time of splice recording. Here, the medium includes: computer-executable instructions for inputting moving image data; computer-executable instructions for encoding moving image data of 24 frames per second which has been input from the input unit by selectively using intra-frame coding, forward predictive coding, and bidirectional predictive coding to generate a first moving image stream which can be displayed as 2-3 pulldown processed moving image data of 30 frames per second; computer-executable instructions for detecting a frame where a redundant field provided in the 2-3 pulldown processing is included and a bottom field is displayed first, from among intra-frame coded frames and forward predictive coded frames which are included in the first moving image stream, and setting the detected frame as an edit starting point; and computer-executable instructions for forming a plurality of tracks on a recording medium and adding system data indicating whether the edit starting point of the first moving image stream is included to the first moving image stream every n tracks, wherein n is an integer of one or more, and recording the first moving image stream and the system data onto the plurality of tracks.

Further features and aspects of the present invention will become apparent from the following description of the exemplary embodiments with reference to the attached drawings.

BRIEF DESCRIPTION OF THE DRAWINGS

FIGS. 7A through 7D are diagrams showing exemplary splice recording position selection processing, according to an aspect of the present invention.

FIG. 8 is a diagram showing an exemplary recording format on tape, according to an aspect of the present invention.

FIG. 9 is a diagram showing exemplary edit point selection processing, according to an aspect of the present invention.

DESCRIPTION OF THE EMBODIMENTS

Exemplary embodiments, features and aspects of the present invention will now herein be described.

Figure 1:
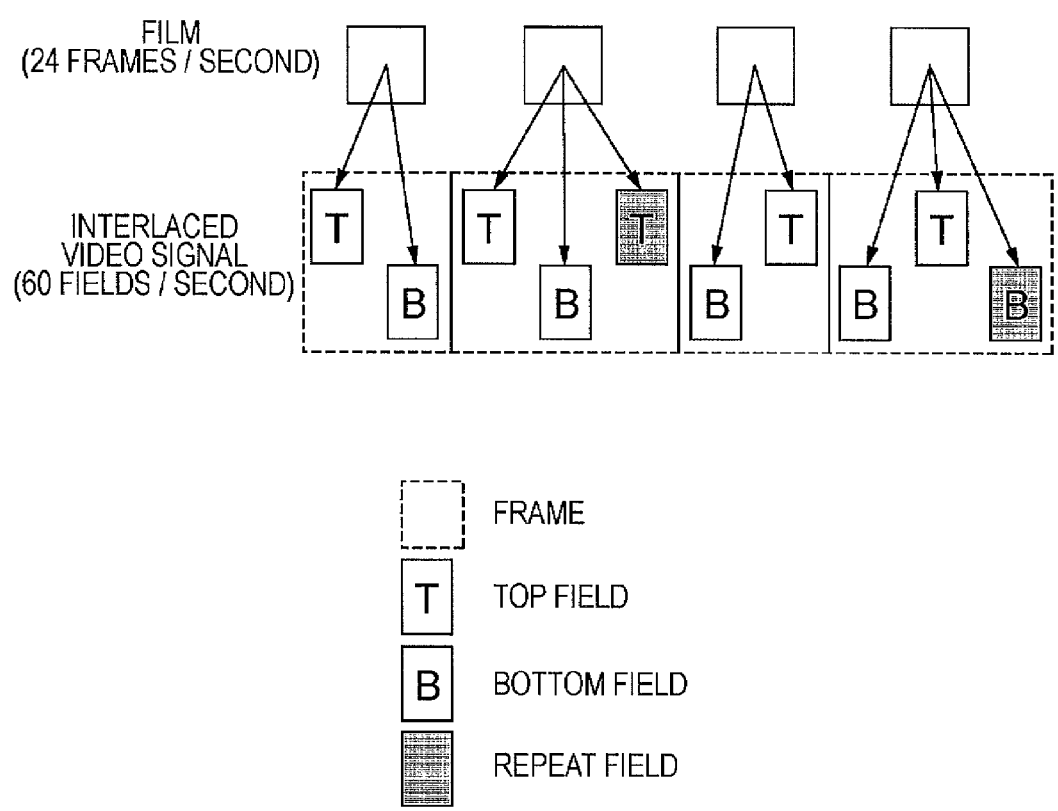
FIG. 1 is a diagram describing the 2-3 pulldown technique.
Figure 2:
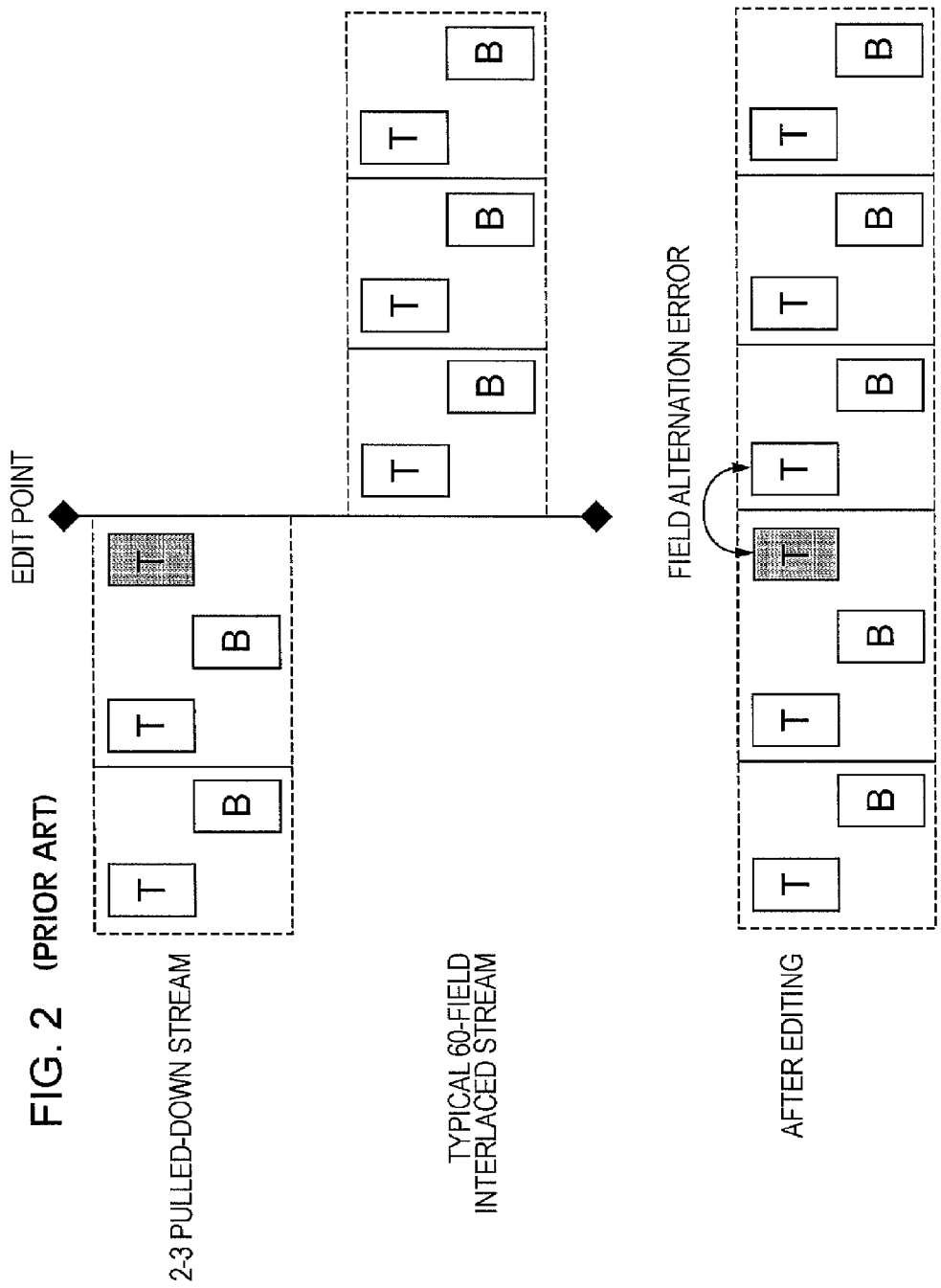
FIG. 2 is a diagram describing a field alternation error at the time of splice recording.
Figure 3:
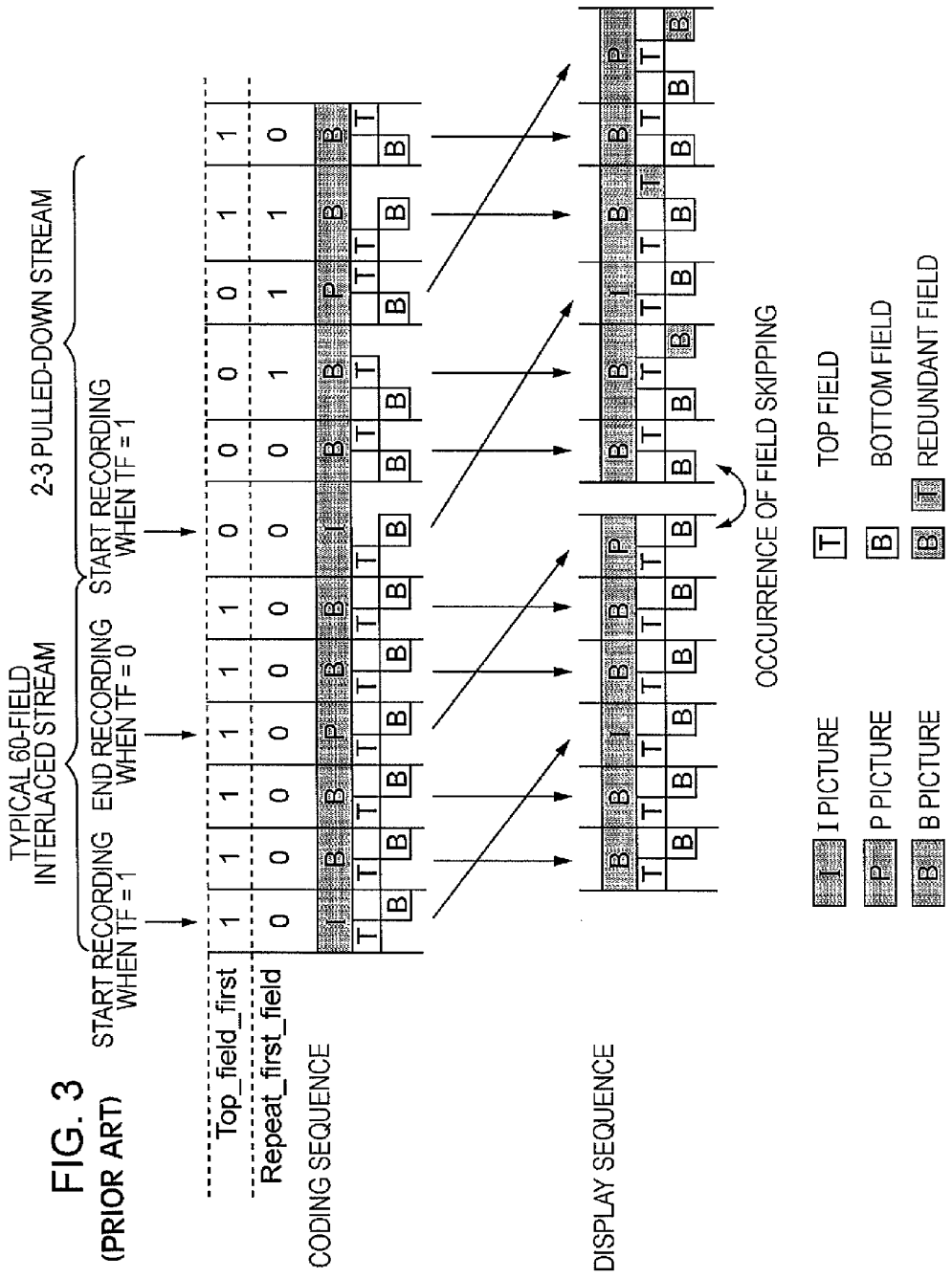
FIG. 3 is a diagram showing an example in which an error occurs at the time of splice recording.
Figure 4:
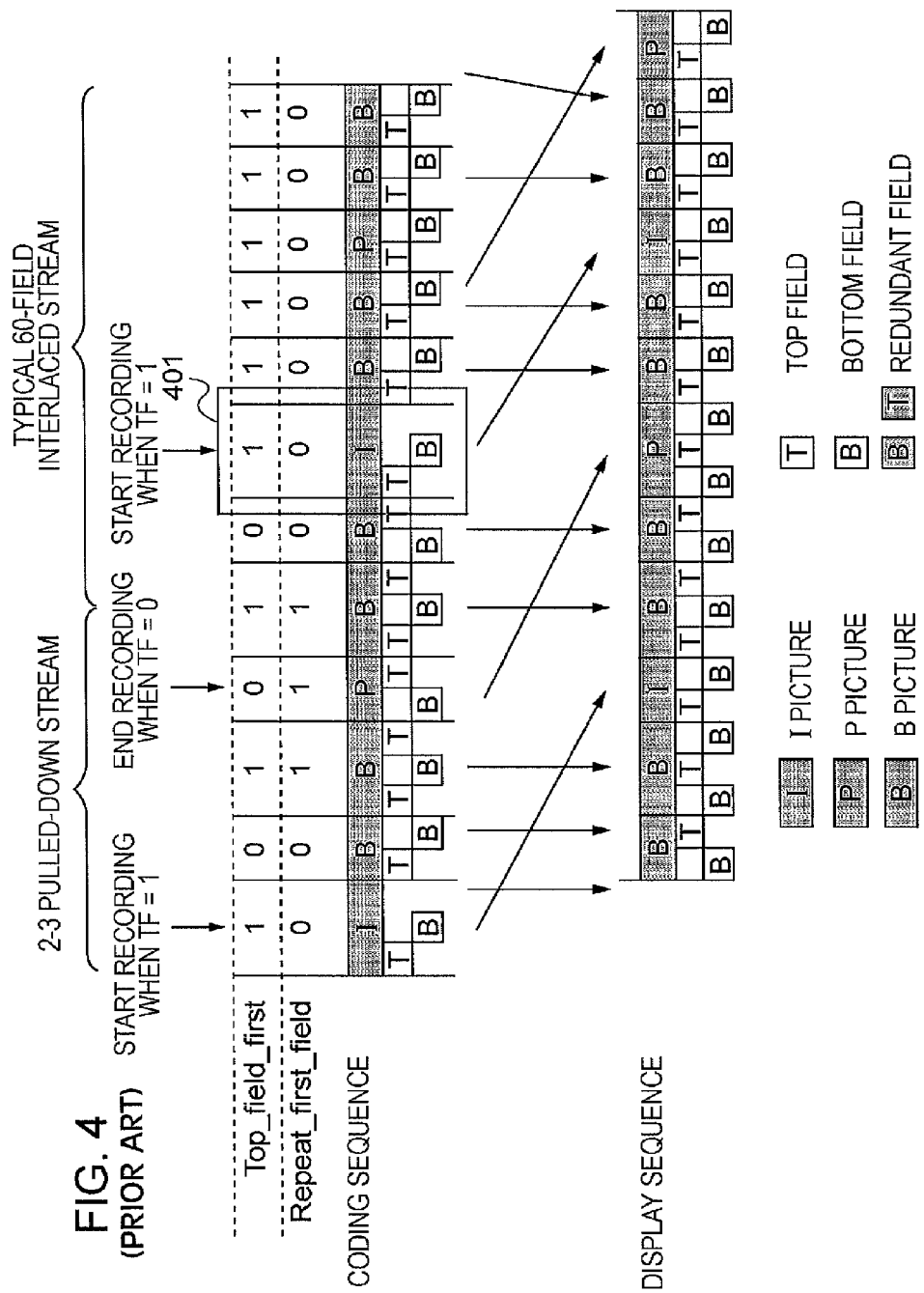
FIG. 4 is a diagram showing an example in which an error occurs at the time of splice recording.
Figure 5:
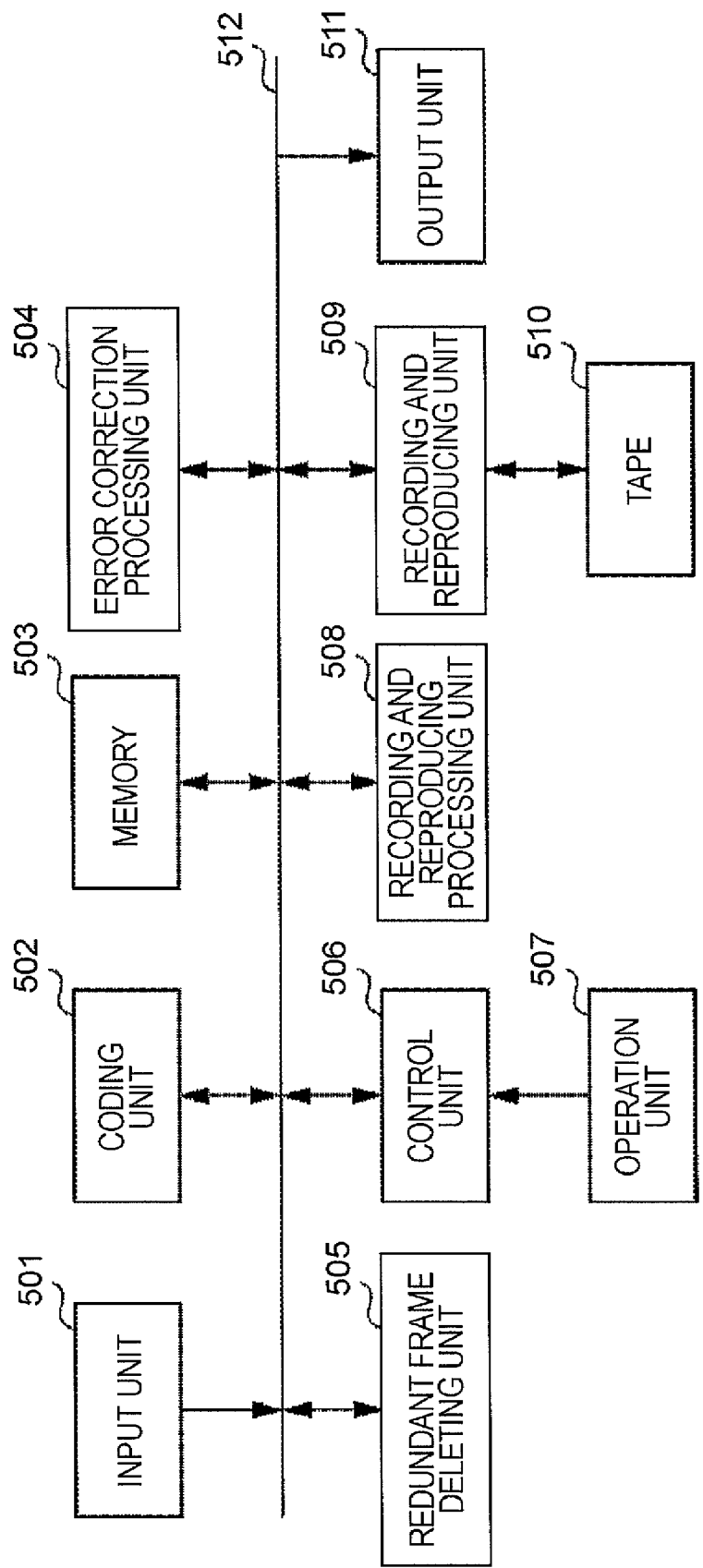
FIG. 5 is a block diagram showing an exemplary configuration of an image recording apparatus according to an embodiment of the present invention.

FIG. 5 is a block diagram showing an exemplary configuration of an image recording apparatus according to an embodiment of the present invention. The recording apparatus is provided with an input unit 501 for receiving 60i, 30p, and 24p moving image data; a coding unit 502 for generating an MPEG stream by encoding the input moving image data in accordance with the MPEG system at the time of recording and for decoding a reproduced MPEG stream at the time of reproduction; a memory 503; and an error correction processing unit 504 for correcting errors by performing error correction coding processing at the time of recording and by performing error correction decoding processing at the time of reproduction.

Still referring to FIG. 5, the recording apparatus also includes a redundant frame deleting unit 505 for detecting and deleting redundant frames included in 24p data which have been provided in 2-3 pulldown processing; a control unit 506 for controlling each unit; an operation unit 507 having various recording and reproducing switches; a recording and reproducing processing unit 508 for adding additional data required for the recording and reproduction of MPEG data at the time of recording and detecting the additional data from reproduction data at the time of reproduction; a recording and reproducing unit 509 for recording data on a tape 510 or reproducing data from the tape 510; the tape 510 being a magnetic tape; an output unit 511; and a data bus 512.

When information acquired from an image pickup device is digitized and input into the recording apparatus as a video signal, the recording apparatus compresses and encodes the received video signal in accordance with the MPEG-2 system, and then records the compressed and encoded video signal onto magnetic recording tape. That is, an image recording apparatus shown in FIG. 5 can record a compressed and encoded bit stream that includes at least one of an I picture, P picture, and B picture, on a recording medium.

The I picture is an intra-frame coded picture that is encoded using only its frame image. The P picture is a forward predictive picture that is encoded in such a manner that the previous I or P picture is used as a reference image, and the difference signal between the reference image and an image to be encoded is encoded. The B picture is a bidirectional predictive picture that is encoded in such a manner that both the previous frame and the subsequent frame are used as reference images, and the difference signal between the reference images and an image to be encoded is encoded.

The recording and reproducing apparatus according to this embodiment can selectively record one of a video signal of the progressive (non-interlace) format (30 frames/second), a video signal of the interlace format (30 frames/second), and a video signal acquired by performing 2-3 pulldown processing upon an image signal of the progressive format (24 frames/second).

The progressive format (30 frames/second), interlace format (30 frames/second), and a format in which 2-3 pulldown processing is performed upon a video signal of the progressive format (24 frames/second) are hereinafter referred to as "30p", "60i", and "24P", respectively.

An exemplary method of deciding a recording start frame and a recording end frame used in splice recording according to an embodiment will now herein be described.

Figure 6A:
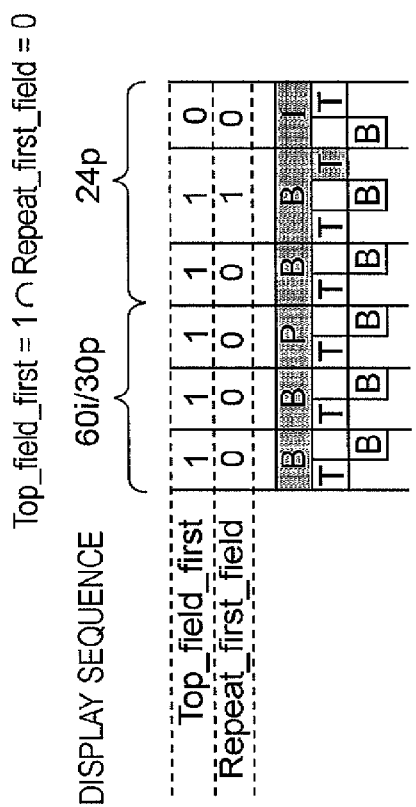
FIGS. 6A through 6D are diagrams showing exemplary recording start frame selection processing, according to an aspect of the present invention.

FIGS. 6A through 6D are diagrams showing exemplary states where a 24p MPEG stream is spliced to a 60i or 30p MPEG stream and is then recorded. In the 60i or 30p MPEG stream, Top_field_first is set to one (Top_field_first=1). FIG. 6A shows a state where the splice recording is started at the frame that indicates Top_field_first=1 and Repeat_first_field=1 in a display sequence. Referring to FIG. 6A, at the recording start point in 24p data shown in the display sequence, a top field is displayed first. Accordingly, the 24p data can be displayed without fail during playback.

In a coding sequence shown in FIG. 6A, the splice recording is started at the I picture that indicates Top_field_first=0 and Repeat_first_field=1. Accordingly, this I picture will be displayed for a three-field period during playback. In this case, the data of the bottom field in the third field of the I picture is a copy of the data of the bottom field in the first field thereof. Therefore, time required for decoding the I picture becomes practically a two-field period.

The last B picture of 60i data which is nearest to a splice point will be displayed for a two-field period. Therefore, during display of this last B picture, the data of the leading I picture of the 24p data can be decoded at the splice point.

In the coding sequence, two B pictures following the leading I picture have data of three fields and data of two fields, respectively. Therefore, in the 24p data in the coding sequence, two fields, three fields, and two fields are sequentially arranged. Accordingly, like the case of the display sequence, no problems occur.

Figure 6B:
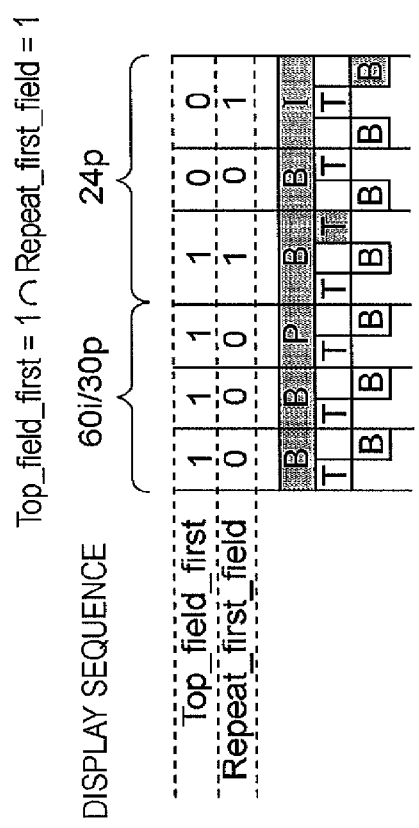

FIG. 6B shows a state where the splice recording is started at the frame that indicates Top_field_first=1 and Repeat_first_field=0 in the display sequence. In this case, since a top field is displayed first in the display sequence, the 24p data can be displayed without fail during playback. On the other hand, in the coding sequence, two fields, two fields, and three fields are sequentially arranged. That is, the 2-3 pulldown sequence is undesirably broken.

Figure 6D:
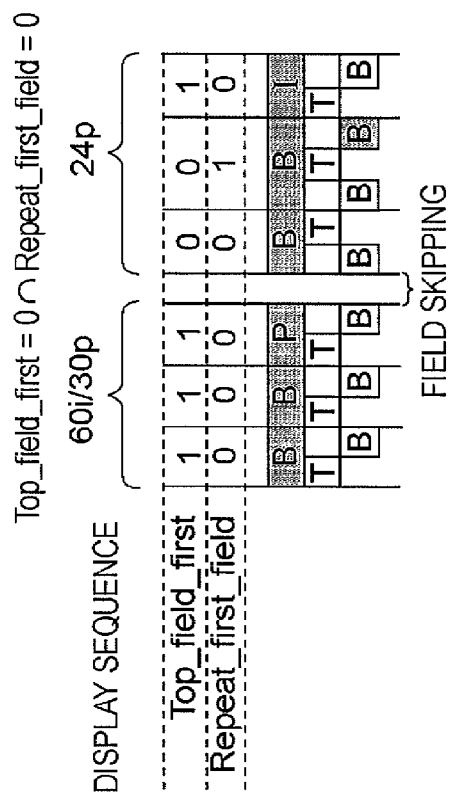
Figure 6C:
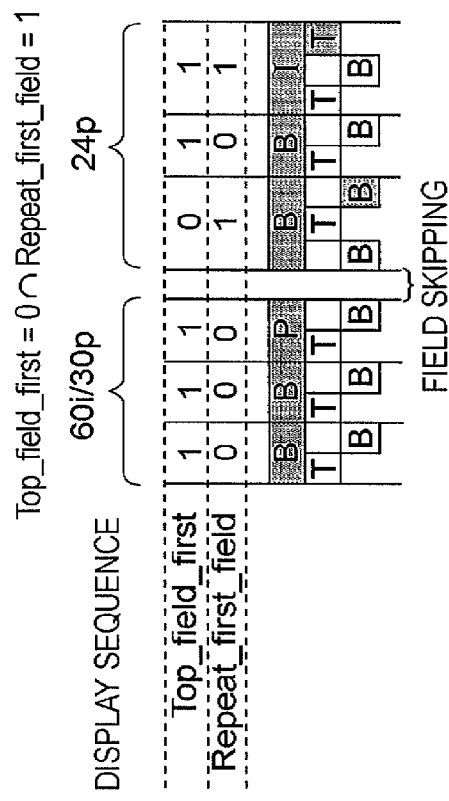

FIG. 6C shows a state where the splice recording is started at the frame that indicates Top_field_first=0 and Repeat_first_field=1 in the display sequence. Here, field skipping (field alternation error) undesirably occurs at the top of an encoded stream.

FIG. 6D shows a state where the splice recording is started at the frame that indicates Top_field_first=0 and Repeat_first_field=0 in the display sequence. Here, field skipping (field alternation error) undesirably occurs at the top of an encoded stream.

Thus, in this embodiment, when a 24p MPEG stream is spliced to a 60i or 30p MPEG stream where Top_field_first is set to one and is then recorded, Top_field_first and Repeat_first_field are individually set to one (Top_field_first=1, Repeat_first_field=1) in the encoding start frame (FIG. 6A).

When a 60i or 30p MPEG stream is spliced to a 60i or 30p MPEG stream and is then recorded, frames placed at the ends of a splice point may have the same value of Top_field_first so as to prevent field skipping. When a 24p stream is spliced to a 24p stream and is then recorded, an encoding start frame may be decided so that 2-3 pulldown continuity can be kept in the display sequence.

Next, a method of deciding a splice point when a 60i or 30p MPEG stream is spliced to a 24p MPEG stream and is then recorded will be described with reference to FIGS. 7A through 7D.

FIGS. 7A through 7D are diagrams showing exemplary states where a 60i or 30p MPEG stream is spliced to a 24p MPEG stream and is then recorded. In the 60i or 30p stream, Top_field_first is set to one (Top_field_first=1).

FIG. 7A shows a state where the splice recording is performed upon a frame that indicates Top_field_first=1 and Repeat_first_field=1 in the display sequence. Here, field skipping (field alternation error) undesirably occurs at the top of an encoded stream.

FIG. 7B shows a state where the splice recording is performed upon a frame that indicates Top_field_first=1 and Repeat_first_field=0 in the display sequence. Here, there is no problem about field continuity, and therefore the splice recording can be achieved.

Figures 7C, 7D:
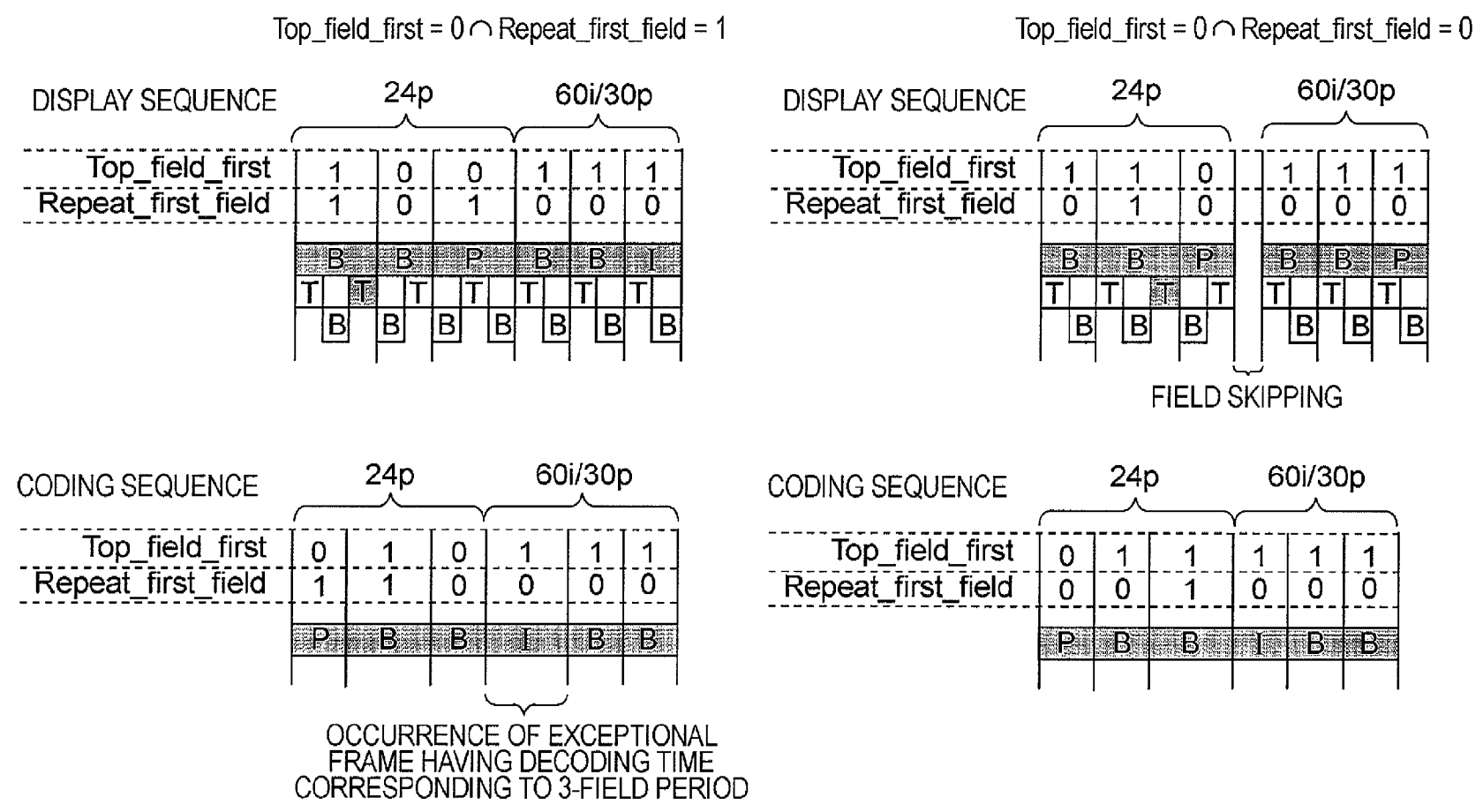

FIG. 7C shows a state where the splice recording is performed upon a frame that indicates Top_field_first=0 and Repeat_first_field=1 in the display sequence. An exceptional frame having a decoding time corresponding to a three-field period undesirably occurs at the top of the 60i or 30p stream.

FIG. 7D shows a state where the splice recording is performed upon a frame that indicates Top_field_first=0 and Repeat_first_field=0 in the display sequence. Here, field skipping (field alternation error) undesirably occurs at the top of an encoded stream.

Thus, in this embodiment, when a 60i or 30p MPEG stream is spliced to a 24p MPEG stream and is then recorded, the 60i or 30p MPEG stream may be recorded in a position following a frame of the 24p MPEG stream which indicates, in the display sequence, Top_field_first=1 and Repeat_first_field=0. Top_field_first=1 means that a top field is displayed first, and Repeat_first_field=0 means that a redundant field is not included in the frame.

When a 60i or 30p stream is spliced to a 60i or 30p stream and is then recorded, frames placed at the ends of a splice point may have the same value of Top_field_first so as to prevent field skipping. When a 24p stream is spliced to a 24p stream and is then recorded, an encoding end frame may be decided so that 2-3 pulldown continuity can be kept in the display sequence.

In the MPEG system, if the data of the I or P picture cannot be decoded, the data of the B picture cannot be decoded. Accordingly, when a 60i or 30p MPEG stream is spliced to a 24p MPEG stream, encoding should be performed so that the I or P picture of the 60i or 30p MPEG stream can be spliced to the 24p MPEG stream first.

Therefore, in this embodiment, when an MPEG stream is recorded, the I or P picture is set as an edit point where the splice recording can be achieved, and data indicating whether this edit point is present is recorded on tape.

Next, exemplary processing performed by a recording apparatus shown in FIG. 5 will be described in detail. Upon receiving a recording start instruction from the operation unit 507, the control unit 506 determines the type of moving image data input from the input unit 501. If the input moving image data is 60i or 30p moving image data, the control unit 506 transmits the 60i or 30p moving image data to the coding unit 502. If the input moving image data is 24p moving image data, the control unit 506 transmits the 24p moving image data to the error correction processing unit 504. The error correction processing unit 504 deletes redundant frames included in the 24p moving image data. Subsequently, the 24p moving image data is transmitted to the coding unit 502.

The method of discriminating between the 60i, 30p, and 24p moving image data is not limited to a particular method. For example, a difference value between frames is obtained, and if the difference value is zero or is a very small value, it can be determined that a redundant frame is included. Consequently, it can be determined that moving image data including the redundant frame is the 24p moving image data.

The coding unit 502 encodes the received moving image data in accordance with the MPEG system and decides the values of Top_field_first and Repeat_first_field for each frame on the basis of the type of the moving image data such as 60i, 30p or 24p and then adds the values to each frame.

The encoded MPEG stream is stored in the memory 503. The recording and reproducing processing unit 508 adds predetermined additional information, synchronization information, and an ID to the MPEG stream stored in the memory 503. The error correction processing unit 504 performs error correction coding processing upon a given amount of data stored in the memory 503. The recording and reproducing unit 509 records the data upon which the error correction coding processing has been performed on many tracks on the tape 510.

FIG. 8 is a diagram showing an exemplary recording format on the tape 510. In this embodiment, the error correction coding processing is performed on tape in units of 16-track data. This unit of 16-track data is referred to as an ECC unit. In an MPEG stream, the starting positions of I and P pictures are set as edit points for splice recording. Additional information about the presence of the edit point is added to each ECC unit. In addition, system data including the number of edit points included in an ECC unit and the track numbers of tracks on which edit points are recorded are added to the starting portion of each ECC unit and are then recorded.

As described previously with reference to FIG. 7, when 60i or 30p data is spliced to 24p data and is then recorded, all I and P pictures included in the 60i or 30p data can be set as edit points.

However, when 24p data is spliced to 60i or 30p data and is then recorded, the 24p data is required to be recorded in a position following the frame of an I picture or a P picture which indicates, in the display sequence, Top_field_first=1 and Repeat_first_field=0. Top_field_first=1 means that a top field is displayed first, and the Repeat_first_field=0 means that a redundant field is not included in the frame.

Accordingly, in this embodiment, when the 24p data is recorded, an I picture or a P picture next to the frame of the I or P picture that indicates, in the display sequence, Top_field_first=1 and Repeat_first_field=0 is set as an edit point.

More specifically, as shown in FIG. 9, at the position of a P picture 901 having Top_field_first=1 and Repeat_first_field=0, splice recording may be performed. Accordingly, an edit point becomes a P picture 902 next to the P picture 901. The P picture 902 has Top_field_first=0 and Repeat_first_field=1.

Figure 10:
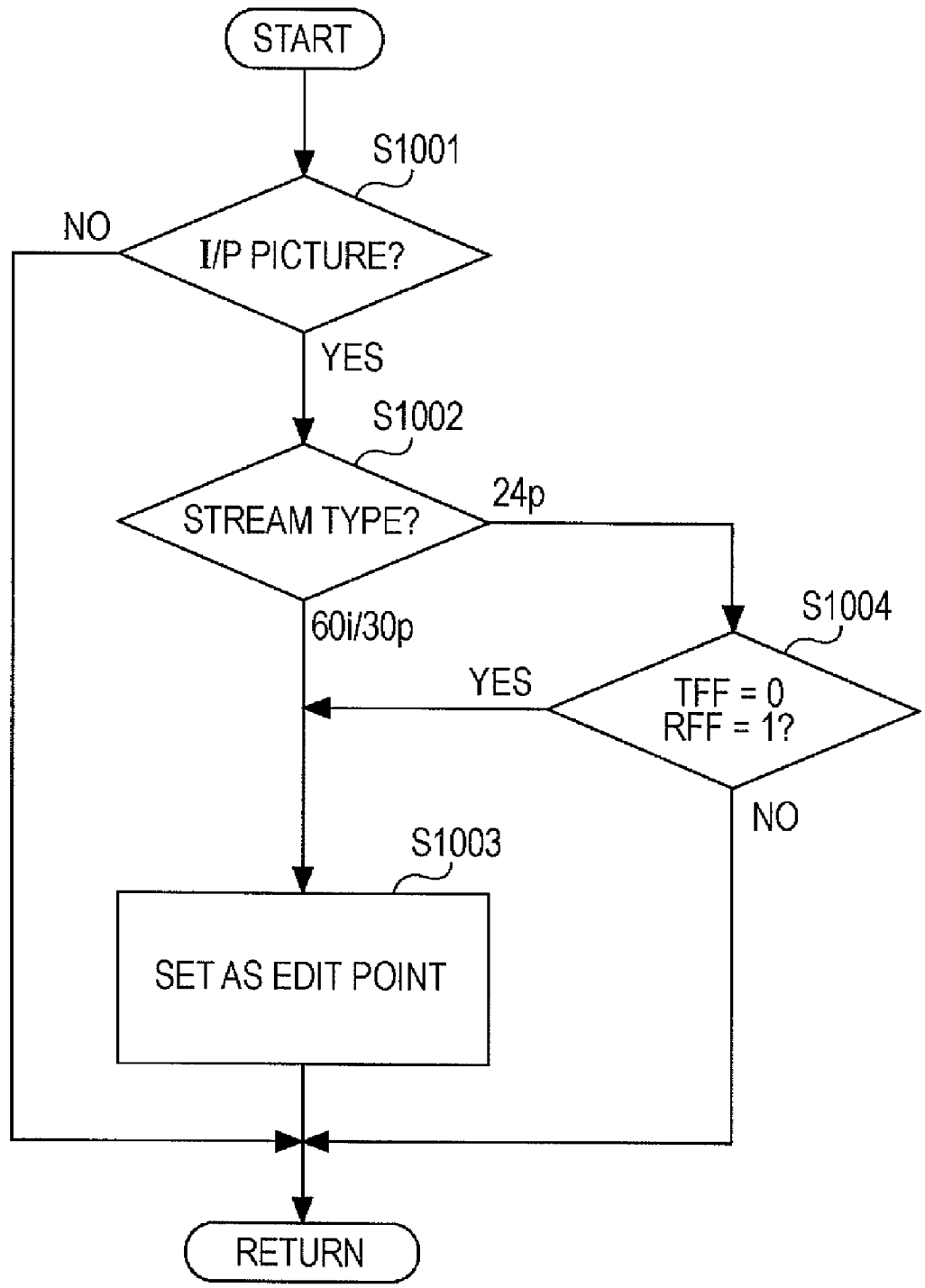
FIG. 10 is a flowchart showing exemplary edit point setting processing, according to an aspect of the present invention.

FIG. 10 is a flowchart showing exemplary edit point setting processing performed by the control unit 506. The processing shown in FIG. 10 is performed each time MPEG data of one frame is processed.

First, it is determined whether a frame to be processed is an I picture or a P picture (step S1001). If the frame is an I picture or a P picture (YES in step S1001), it is further determined whether currently recorded moving image data is 60i, 30p, or 24p data (step S1002). If the currently recorded moving image data is 60i or 30p data, the I or P picture is set as an edit point (step S1003). If the currently recorded moving image data is 24p data, it is determined whether the I or P picture has Top_field_first=0 and Repeat_first_field=1 (step S1004). If the I or P picture has Top_field_first=0 and Repeat_first_field=1 (YES in step S1004), the I or P picture is set as an edit point. If the I or P picture does not have Top_field_first=0 and Repeat_first_field=1 (NO in step S1004), the I or P picture is not set as an edit point.

Thus, if 24p data is recorded, an edit point is set so that 24p data can be spliced to a position following the I or P picture that has Top_field_first=1 and Repeat_first_field=0 and then be recorded. Consequently, using the edit point set as above, the splice recording of any data of 60i, 30p, and 24p can be achieved, whereby the recorded data can be reproduced as intended. Top_field_first=1 means that a top field is displayed first, and the Repeat_first_field=0 means that there is no redundant fields.

Next, exemplary reproduction processing will be described. Upon receiving a reproduction instruction from the operation unit 507, the control unit 506 controls the recording and reproducing unit 509 to reproduce data stored on the tape 510. The error correction processing unit 504 corrects an error included in the currently reproduced data and then transmits the data to the memory 503. The recording and reproducing processing unit 508 detects additional information such as system data included in the data stored in the memory 503 and then transmits the additional data to the control unit 506. The coding unit 502 decodes the MPEG data stored in the memory 503 and outputs the decoded data via the output unit 511.

Next, splice recording processing will be described. If image data is newly recorded on the tape 510 on which 60i, 30p, or 24p data has already been recorded, first, the control unit 506 detects an edit point nearest to the current tape position when power is turned on.

More specifically, the control unit 506 controls the recording and reproducing unit 509 to reproduce data stored on the tape 510 and checks system data included in each ECC unit. Subsequently, the data of an ECC unit including the nearest edit point is reproduced and is then stored in the memory 503. Here, the conveyance of the tape 510 is stopped, and the tape 510 is rewound a predetermined amount, whereby the tape 510 is placed in a recording pause state.

When a recording start instruction is transmitted, an ECC unit is newly generated by merging the MPEG data input before the nearest edit point with MPEG data input after the nearest edit point in the ECC unit stored in the memory 503. Error correction encoding is then performed upon the new ECC unit. By overwriting the data of the original ECC unit having the nearest edit point with the data of the new ECC unit at a track position where the original ECC unit is recorded, splice recording can be started.

The description of the recording start frame used when 24p data is recorded has been described with reference to FIG. 6. When 60i or 30p data is recorded, recording may be started at any frame.

Thus, according to this embodiment, there can be provided an image recording apparatus capable of desirably performing splice recording onto any combination of coding streams such as 60i, 30p, and 24p streams.

In this embodiment, when the recording of 60i or 30p data is started, Top_field_first=1 is set. If Top_field_first=0 is set, the frame including an edit point used for 24p data recording is required to have Top_field_first=1 and Repeat_first_field=1.

In this embodiment, system data is added in units of 16 tracks. However, an ECC unit may have n tracks (n is an integer of one or more), and system data may be added in units of n tracks.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-266795 filed Sep. 14, 2005, which is hereby incorporated by reference herein in its entirety.

What is claimed is:

1. A recording apparatus comprising:
   an input unit configured to input moving image data;
   a generating unit configured to encode moving image data of 24 frames per second which has been input from the input unit by selectively using intra-frame coding, forward predictive coding, and bidirectional predictive coding to generate first coded moving image data which can be displayed as 2-3 pulldown processed moving image data of 30 frames per second;
   a designating unit configured to designate a frame where a redundant field provided in the 2-3 pulldown processing is included and a bottom field is displayed first, from among intra-frame coded frames and forward predictive coded frames which are included in the first coded moving image data, as an edit starting frame, wherein the designating unit does not designate a frame where a redundant field provided in the 2-3 pulldown processing is not included and a top field is displayed first, from among intra-frame coded frames and forward predictive coded frames which are included in the first coded moving image data, as the edit starting frame; and
   a recording unit configured record the first coded moving image data output from the generating unit and additional information for discriminating the edit start frame on a recording medium.

2. The recording apparatus according to claim 1, wherein the generating unit encodes moving image data of 30 frames per second input from the input unit by selectively using the intra-frame coding, the forward predictive coding, and the bidirectional predictive coding to generate second coded moving image data, a top field of each frame of the second coded moving image data being displayed first,
   wherein the designating unit designates all intra-frame coded frames and all forward predictive coded frames which are included in the second coded moving image data as the edit starting frames, and
   wherein the recording unit records the second coded moving image data and the additional information on the recording medium.

3. The recording apparatus according to claim 2, further comprising a control unit configured to detect the edit starting frame recorded on the recording medium, and cause the recording unit to start splice recording of the first or second coded moving image data at the detected edit starting frame.

4. The recording apparatus according to claim 1, wherein the recording unit starts recording at a frame of the first coded moving image in which a redundant frame provided in the 2-3 pulldown processing is included and a bottom field is displayed first.

5. A recording apparatus comprising:
   an input unit configured to input moving image data;
   a generating unit configured to generate first coded moving image data and second coded moving image data, wherein the generating unit encodes moving image data of 24 frames per second which has been input from the input unit by selectively using intra-frame coding, forward predictive coding, and bidirectional predictive coding to generate the moving image stream which can be displayed as 2-3 pulldown processed moving image data of 30 frames per second, and encodes moving image data of 30 frames per second input from the input unit by selectively using the intra-frame coding, the forward predictive coding, and the bidirectional predictive coding to generate the second coded moving image data, a top field of each frame of the second coded moving image data being displayed first;
   a recording unit configured to record the first moving image data and the second coded moving image data output from the generating unit on a recording medium; and
   a control unit configured to designate a predetermined frame in the first coded moving image data recorded on the recording medium and control the recording unit so as to record the second coded moving image data at a next frame to the predetermined frame,
   wherein the control unit designates a frame where a redundant field provided in the 2-3 pulldown processing is not included and a top field is displayed first, from among intra-frame coded frames and forward predictive coded frames which are included in the first coded moving image data, as the predetermined frame, and
   wherein the control unit does not designate a frame where a redundant field provided in the 2-3 pulldown processing is included and a bottom field is displayed first, from among intra-frame coded frames and forward predictive coded frames which are included in the first coded moving image data, as the predetermined frame.

6. A method performed in a recording apparatus for generating a continuous compressed and encoded stream without occurring a field alternation error and field skipping at the time of splice recording, the method comprising:
   inputting moving image data;
   encoding moving image data of 24 frames per second which has been input from the input unit by selectively using intra-frame coding, forward predictive coding, and bidirectional predictive coding to generate first coded moving image data which can be displayed as 2-3 pulldown processed moving image data of 30 frames per second;

designating a frame where a redundant field provided in the 2-3 pulldown processing is included and a bottom field is displayed first, from among intra-frame coded frames and forward predictive coded frames which are included in the first coded moving image data as an edit starting frame, wherein the designating does not designate a frame where a redundant field provided in the 2-3 pulldown processing is not included and a top field is displayed first, from among intra-frame coded frames and forward predictive coded frames which are included in the first coded moving image data, as the edit starting frame; and recording the first coded moving image data output and additional information for discriminating the edit start frame on a recording medium.

7. The method according to claim 6, further comprising, encoding moving image data of 30 frames per second by selectively using the intra-frame coding, the forward predictive coding, and the bidirectional predictive coding to generate second coded moving image data, a top field of each frame of the second coded moving image data being displayed first, designating all intra-frame coded frames and all forward predictive coded frames which are included in the second coded moving image data as the edit starting frames, and recording the second coded moving image data and the additional information on the recording medium.

8. The method according to claim 7, further comprising detecting the edit starting frame recorded on the recording medium, and initiating splice recording of the first or second coded moving image data at the detected edit starting frame.

9. The method according to claim 6, further comprising initiating recording at a frame of the first coded moving image data in which a redundant frame provided in the 2-3 pulldown processing is included and a bottom field is displayed first.

10. A method performed in a recording apparatus for generating a continuous compressed and encoded stream without occurring a field alternation error and field skipping at the time of splice recording, the method comprising:

inputting moving image data;

generating first coded moving image data and second coded moving image data, wherein the generating encodes moving image data of 24 frames per second which has been input by selectively using intra-frame coding, forward predictive coding, and bidirectional predictive coding to generate the first coded moving image stream which can be displayed as 2-3 pulldown processed moving image data of 30 frames per second, and encodes moving image data of 30 frames per second input by selectively using the intra-frame coding, the forward predictive coding, and the bidirectional predictive coding to generate the second coded moving image data, a top field of each frame of the second coded moving image data being displayed first;

recording the first moving image data and the second coded moving image data output from the generating unit on a recording medium;

designating a predetermined frame in the first coded moving image data recorded on the recording medium and control the recording so as to record the second coded moving image data at a next frame to the predetermined frame, wherein the controlling designates a frame where a redundant field provided in the 2-3 pulldown processing is not included and a top field is displayed first, from among intra-frame coded frames and forward predictive coded frames which are included in the first coded moving image data, as the predetermined frame, and wherein the controlling does not designate a frame where a redundant field provided in the 2-3 pulldown processing is included and a bottom field is displayed first, from among intra-frame coded frames and forward predictive coded frames which are included in the first coded moving image data, as the predetermined frame.

* * * * *